United States Patent
Sakakibara et al.

(10) Patent No.: US 7,222,906 B2
(45) Date of Patent: May 29, 2007

(54) MOUNTING STRUCTURE FOR CONSOLE

(75) Inventors: Yasuhiro Sakakibara, Aichi-ken (JP); Hiroto Ikuta, Nagoya (JP); Akira Tanaka, Toyota (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 224 days.

(21) Appl. No.: 11/110,828

(22) Filed: Apr. 21, 2005

(65) Prior Publication Data

US 2005/0236859 A1 Oct. 27, 2005

(30) Foreign Application Priority Data

Apr. 22, 2004 (JP) .............................. 2004-127101

(51) Int. Cl.
*B60R 7/04* (2006.01)
(52) U.S. Cl. ................... 296/24.34; 296/37.8
(58) Field of Classification Search ............. 296/24.34, 296/37.8
See application file for complete search history.

(56) References Cited

U.S. PATENT DOCUMENTS

| | | | | |
|---|---|---|---|---|
| 4,874,276 A | * | 10/1989 | Iguchi | 411/48 |
| 5,106,143 A | * | 4/1992 | Soeters | 296/37.8 |
| 5,636,891 A | * | 6/1997 | Van Order et al. | 296/37.7 |
| 6,074,150 A | * | 6/2000 | Shinozaki et al. | 411/508 |
| 6,141,837 A | * | 11/2000 | Wisniewski | 24/295 |
| 6,565,116 B1 | * | 5/2003 | Tajima et al. | 280/730.2 |
| 6,575,528 B2 | * | 6/2003 | Tiesler et al. | 296/214 |
| 6,824,185 B2 | * | 11/2004 | Tiesler et al. | 296/37.8 |
| 7,055,882 B2 | * | 6/2006 | Santaolalla Gil et al. | 296/37.7 |

FOREIGN PATENT DOCUMENTS

JP A-H08-11635 1/1996

* cited by examiner

*Primary Examiner*—Dennis H. Pedder
*Assistant Examiner*—Michael Hernandez
(74) *Attorney, Agent, or Firm*—Posz Law Group, PLC

(57) ABSTRACT

A console is attached to brackets fixed to a floor panel of a vehicle. Each bracket has a pair of fitting holes. The console includes a console body having a rectangular bottom wall. An insertion hole is formed in each of the four corners of the bottom wall. Each insertion hole corresponds to one of the fitting holes. Clips are provided at portions of the bottom wall, each portion corresponding to one of the insertion holes. Each clip has two fitting portions that are arranged to face each other. When each clip is inserted into the corresponding fitting hole, the fitting portions are fitted to an inner wall of the fitting hole so that the console body is attached to the brackets. With the clips inserted into the fitting holes, a fastening member having two legs is inserted into each insertion hole so that the legs are located between the corresponding fitting portions to prevent the clip from being removed from the fitting hole.

17 Claims, 8 Drawing Sheets

MOUNTING STRUCTURE FOR CONSOLE

BACKGROUND OF THE INVENTION

The present invention relates to a mounting structure for a console located between the driver's seat and the front passenger seat in a vehicle such as an automobile.

Conventionally, a console is installed in a vehicle by using screws. However, installment with screws involves troublesome steps in which a worker has to get on and off a vehicle a number of times in an automobile assembly line. In this respect, for example, Japanese Laid-Open Patent Publication No. 8-11635 discloses a console that facilitates the assembly. The console of the publication includes a body. A rib projects downward from an inner surface of an upper wall of the body. A fixing clip is attached to the rib. On the other hand, a bracket is fixed to a floor tunnel to which the console is to be attached. The bracket has a slit. The fixing clip of the body is engaged with the slit so that the console is installed on the floor tunnel. This console does not require screws to install the console to the floor tunnel of a vehicle, and thus facilitates the installment of the console to the floor tunnel.

However, in the above configuration, in which the console is fixed only by engaging the fixing clip with the bracket slit, since the fixing clip is easily deformed, the console is not fixed sufficiently firmly. The console is therefore highly likely to chatter. Consequently, to prevent the console from chattering, the console needs to be secured to the floor tunnel with screws. This complicates the installment.

SUMMARY OF THE INVENTION

Accordingly, it is an objective of the present invention to provide a mounting structure for a console that facilitates installment of a console body, and reliably prevents the console body from chattering.

To achieve the foregoing and other objectives and in accordance with the purpose of the present invention, a console attached to a floor panel of a vehicle is provided. The floor panel has a fitting hole. The console includes a console body, a clip, and a fastening member. The console body has a bottom wall. The bottom wall has an insertion hole. The clip is provided at a portion of the bottom wall that corresponds to the insertion hole. The clip has at least two fitting portions that are arranged to face each other. When the clip is inserted into the fitting hole, the fitting portions are fitted to an inner wall of the fitting hole so that the console body is attached to the floor panel. The fastening member is inserted into the insertion hole, and has a leg. When the fastening member is inserted into the insertion hole with the clip inserted into the fitting hole, the leg is located between the fitting portions to prevent the clip from being removed from the fitting hole.

The present invention also provides a structure for mounting a console onto a floor panel of a vehicle. A plurality of brackets each having fitting holes are fixed to the floor panel. The console includes a console body having a rectangular bottom wall. An insertion hole is formed in each of the four corners of the bottom wall. Each insertion hole corresponds to one of the fitting holes. Clips are provided at portions of the bottom wall, each portion corresponding to one of the insertion holes. Each clip has at least two fitting portions that are arranged to face each other. When each clip is inserted into the corresponding fitting hole, the fitting portions are fitted to an inner wall of the fitting hole so that the console body is attached to the brackets. With the clips inserted into the fitting holes, a fastening member having a leg is inserted into each insertion hole so that the leg is located between the corresponding fitting portions to prevent the clip from being removed from the fitting hole.

The present invention further provides another structure for mounting a console onto a floor panel of a vehicle. A bracket having an insertion hole is fixed to the floor panel. A clip is provided at a portion of the bracket that corresponds to the insertion hole. The clip has at least two fitting portions that are arranged to face each other. The console includes a console body having a bottom wall. A fitting hole is formed in the bottom wall. When the clip is inserted into the fitting hole, the fitting portions are fitted to an inner wall of the fitting hole so that the console body is attached to the bracket. With the clip inserted into the fitting hole, a fastening member having a leg is inserted into the insertion hole so that the leg is located between the fitting portions to prevent the clip from being removed from the fitting hole.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to the drawings.

Figure 1:
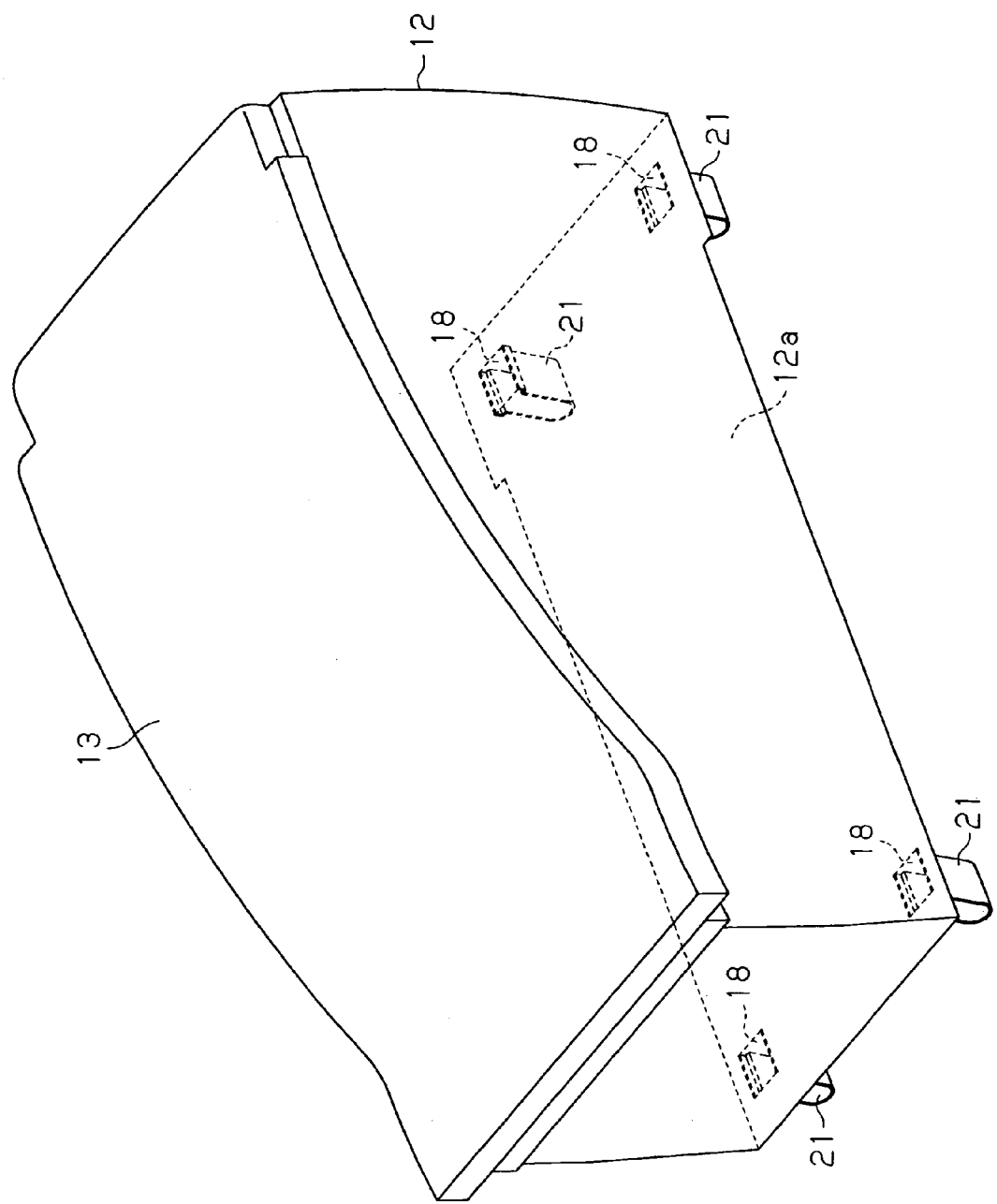
FIG. 1 is a perspective view illustrating a console body according to one embodiment.
Figure 5:
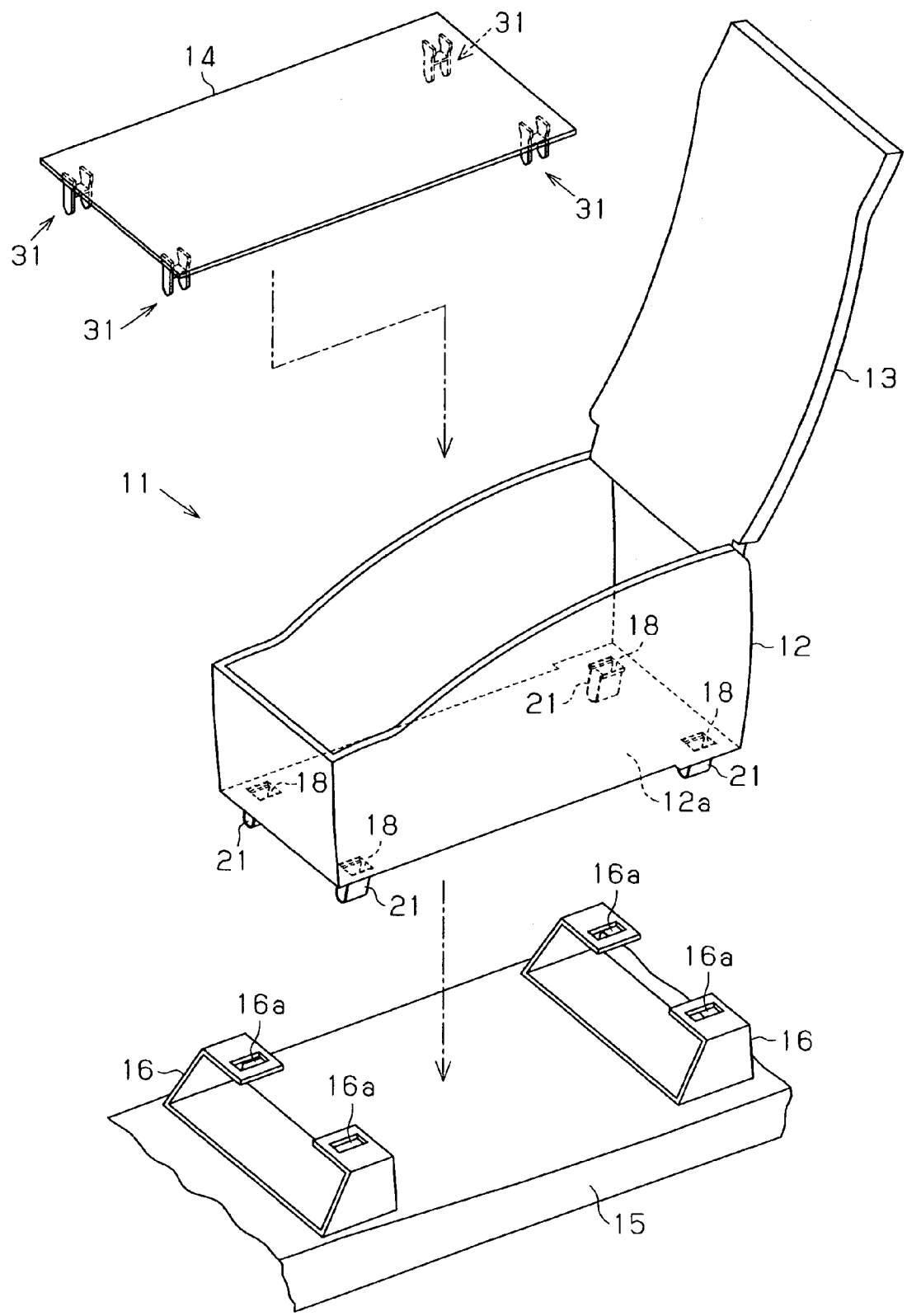
FIG. 5 is an exploded perspective view illustrating the console of the embodiment shown in FIG. 1.

As shown in FIGS. 1 and 5, a console 11 includes a rectangular console body 12 having a bottom, a lid 13, a bottom cover 14 placed on a bottom wall 12a of the console body 12. The console 11 is located between the driver's seat and the front passenger seat in a passenger compartment of a vehicle. The longitudinal direction of the console 11 coincides with the front-to-rear direction of the vehicle. A pair of front and rear brackets 16 are fixed to a floor panel 15 forming the floor of the vehicle. The console 11 is attached to the brackets 16. The brackets 16 can be regarded as components that form part of the floor panel 15.

Figure 3:
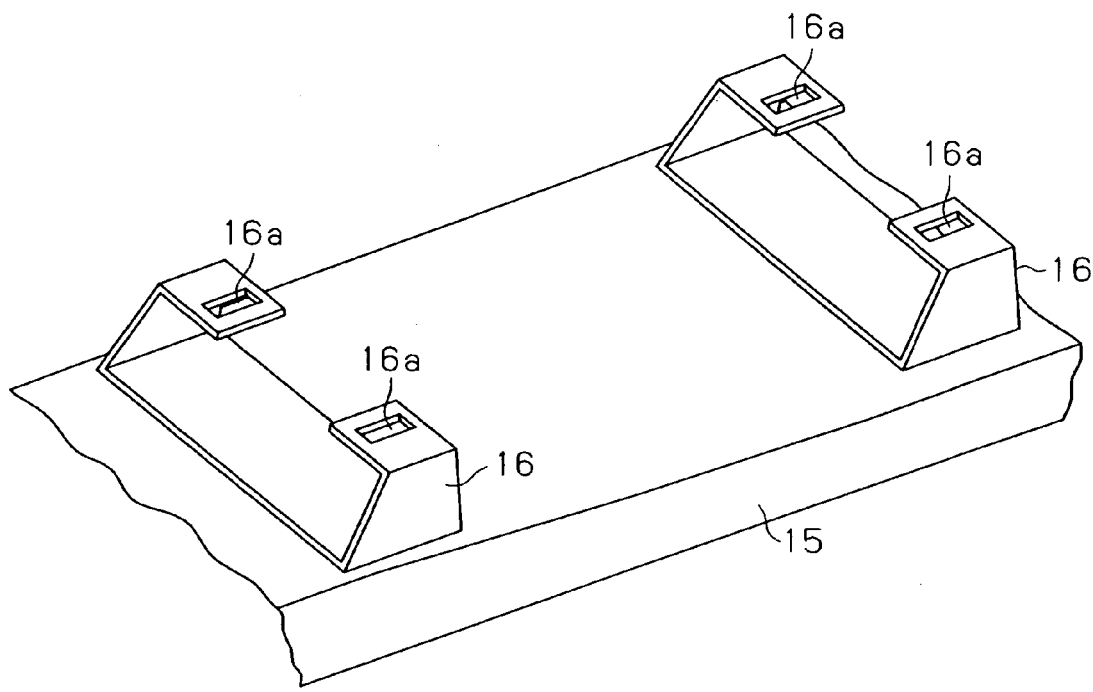
FIG. 3 is a perspective view illustrating brackets of the embodiment shown in FIG. 1.

As shown in FIG. 3, the brackets 16 are located at a position corresponding to a front portion of the console body 12 (front position with respect to the front-to-rear direction of the vehicle) and a position corresponding to a rear portion of the console body 12 (rear position with respect to the front-to-rear direction of the vehicle), respectively. Each bracket 16 is made of a metal plate and has a pair of left and right fitting holes 16a.

Figure 2A:
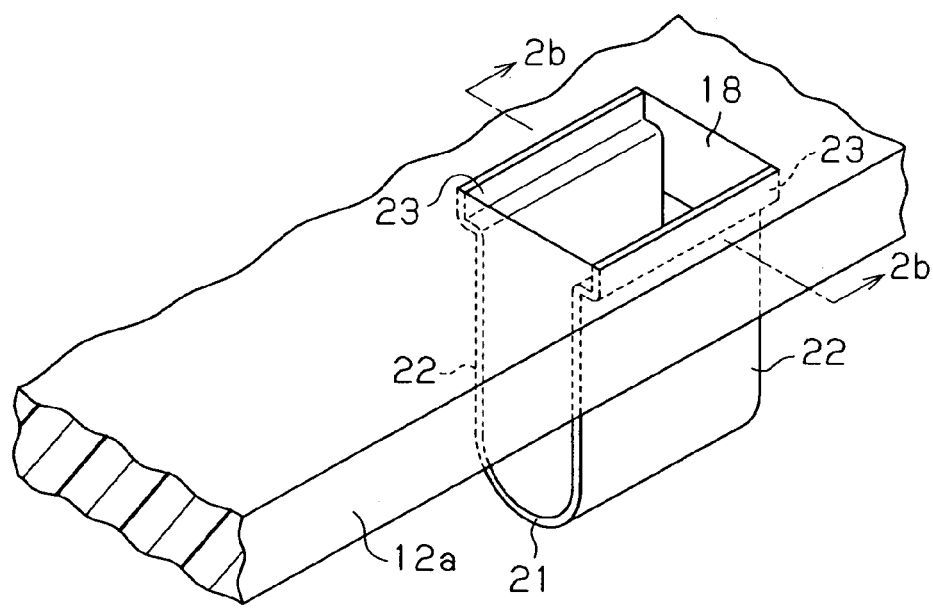
FIG. 2(a) is a partial perspective view illustrating an engaged state of a clip of the console body shown in FIG. 1.
Figure 2B:
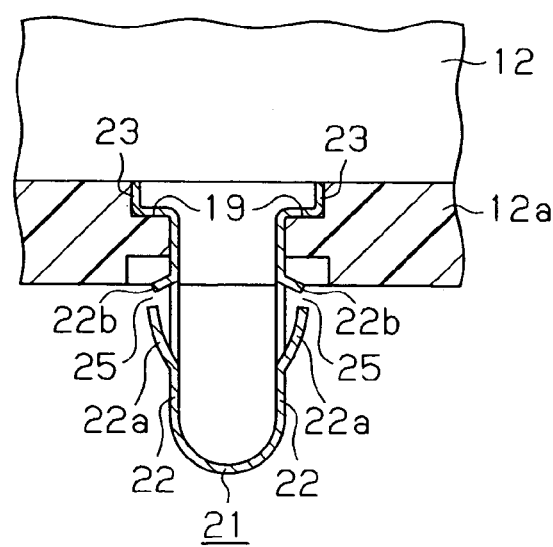
FIG. 2(b) is a cross-sectional view taken along line 2b–2b in FIG. 2(a)

The console body 12 of the console 11 according to the present embodiment will now be described with reference to FIG. 1. The console body 12 is made of synthetic resin and designed to accommodate things. An insertion hole 18 is formed in each of the four corners of the bottom wall 12a of the console body 12. As shown in FIGS. 2(a) and 2(b), a step is formed on each lateral end of each insertion hole 18. The steps of each insertion hole 18 function as a clip seat 19.

The lid 13, which is shown in FIG. 1, is pivotally held by the side walls of the console body 12 such that the lid 13 pivots vertically about the rear end. The lid 13 therefore covers the upper opening of the console body 12 so that the opening is selectively open and closed.

An upper portion of a clip 21 is fitted into each insertion hole 18. The clips 21 are each made of an elastic metal plate. Specifically, as shown in FIG. 2(b), each clip 21 is formed by bending a metal plate into a laterally symmetrical shape so that the clip 21 is U-shaped with an upper opening as viewed from the front. Also, each clip 21 has a pair of laterally arranged side walls. When the console body 12 is assembled with the brackets 16, the side walls function as fitting portions 22 that are fitted into the fitting holes 16a of the brackets 16 (see FIG. 6(c)). Hereinafter, facing surfaces of each fitting portion 22 are referred to as inner surfaces.

Each clip 21 includes a pair of guide portions 23, which are formed by bending upper portion of the clip 21 into an L shape. The guide portions 23 of each clip 21 are placed on the corresponding seats 19 of the bottom wall 12a of the console body 12 so that the clip 21 is held by the bottom wall 12a.

As shown in FIG. 2(b), a projection 22a is formed on the outer surface of each fitting portion 22 of each clip 21. The projection 22a is formed by cutting a sidewall of the fitting portion 22 and projects upward diagonally. Also, above the projection 22a on the outer surface of each fitting portion 22, a holding portion 22b is formed by cutting the sidewall. Each holding portion 22b projects downward diagonally. Each pair of the projection 22a and the holding portion 22b are arranged such that the distal ends are close to each other with a gap 25 in between.

Figure 4:
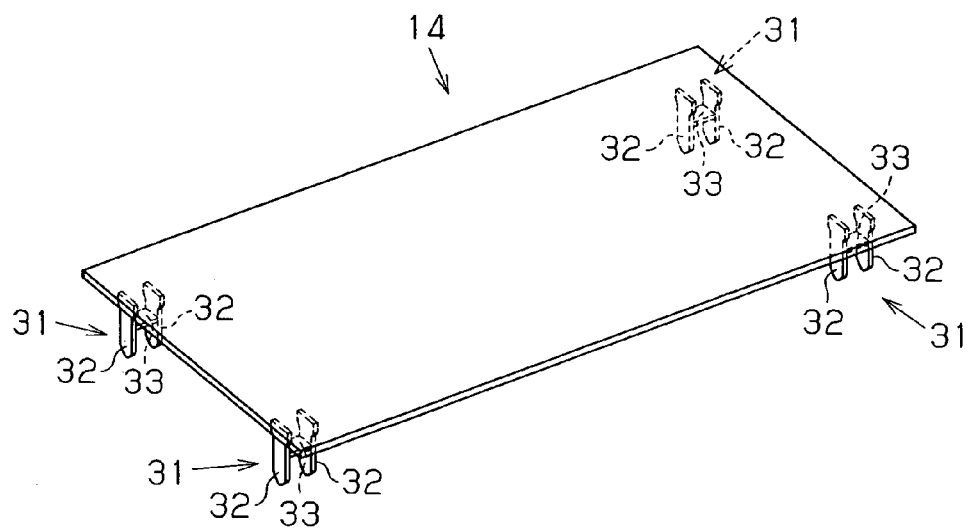
FIG. 4 is a perspective view illustrating a bottom cover of the embodiment shown in FIG. 1.

The bottom cover 14 will now be described. As shown in FIG. 4, the bottom cover 14 is a rectangular plate, which is placed on the bottom wall 12a of the console body 12 such that the longitudinal direction coincides with the front-to-rear direction of the vehicle. The bottom cover 14 is placed on the bottom wall 12a of the console body 12 through the opening of the console body 12 (see FIG. 5).

A fastening member 31 is provided in each of the four corners of the lower surface of the bottom cover 14. Each fastening member 31 corresponds to one of the insertion holes 18 of the console body 12. The fastening members 31 are integrally formed with the bottom cover 14. Each fastening member 31 includes a pair of legs 32 that project downward from the lower surface of the bottom cover 14. Each leg 32 is rectangular as viewed from front. Each pair of the legs 32 are placed parallel to each other with respect to the front-to-rear direction of the vehicle. That is, each pair of the legs 32 are arranged such that the inner surfaces face each other with respect to the front-to-rear direction of the vehicle. A horizontally extending reinforcing portion 33 is provided between each pair of the legs 32. The reinforcing portion 33 is located close to the proximal ends of the legs 32. The reinforcing portion 33 prevents the legs 32 from being deformed when receiving an external force applied to the legs 32. That is, the reinforcing portion 33 prevents the legs 32 from approaching each other.

Figure 6A:
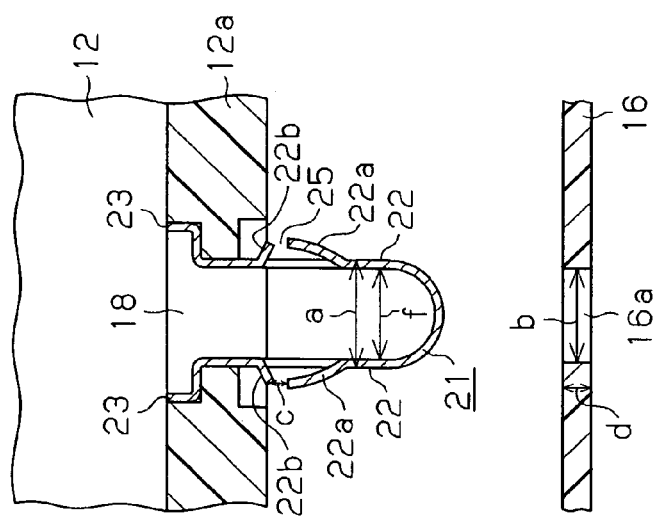
FIG. 6(a) is a partial cross-sectional view illustrating the console body of FIG. 1, before the console body is assembled with the brackets.
Figure 7A:
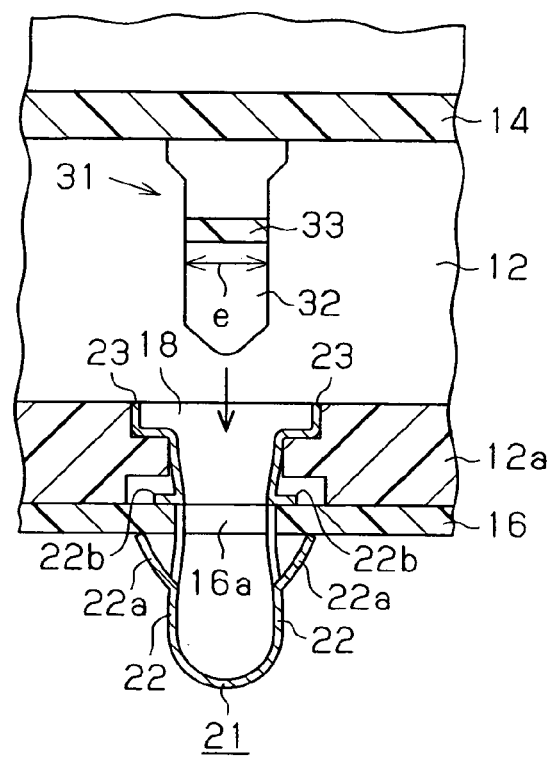
FIG. 7(a) is a partial cross-sectional view illustrating the console body of FIG. 1, before the bottom cover is assembled with the brackets.

As shown in FIGS. 6(a) and 7(a), in a state before inserted into the corresponding fitting hole 16a, the lateral distance a between the fitting portions 22 of each clip 21 is substantially equal to or slightly greater than a width b of the fitting hole 16a along a direction perpendicular to the longitudinal direction. The distance c between the distal ends of the projection 22a and the holding portion 22b of each clip 21 is less than the thickness d of a portion of the bracket 16 surrounding the fitting hole 16a. In addition, the width e of each leg 32 of the bottom cover 14 is substantially equal to or slightly greater than a lateral distance f between the fitting portions 22 of the corresponding clip 21. Therefore, when the bottom cover 14 is placed on the bottom wall 12a of the console body 12, each pair of legs 32 are located between the corresponding fitting portions 22 with the lateral sides of the leg 32 contacting the fitting portions 22 (see FIG. 7(b)). In this state, the fitting portions 22 are held between the legs 32 and the inner wall of the fitting hole 16a (wall surface of the bracket 16 the define the fitting hole 16a). In addition, the projections 22a and the holding portions 22b hold the corresponding bracket 16 (a portion of the bracket that forms the fitting hole 16a) in between. Also, the insertion holes 18 of the console body 12 are covered by the bottom cover 14 so that the insertion holes 18 are not exposed to the interior of the console body 12.

Next, a method for installing the console 11 will now be described.

When installing the console 11 to the brackets 16 on the floor panel 15, the bottom wall 12a of the console body 12, to which the clips 21 are attached, is caused to approach the brackets 16 as shown in FIG. 6(a) so that each clip 21 faces the corresponding fitting hole 16a.

Figure 6B:
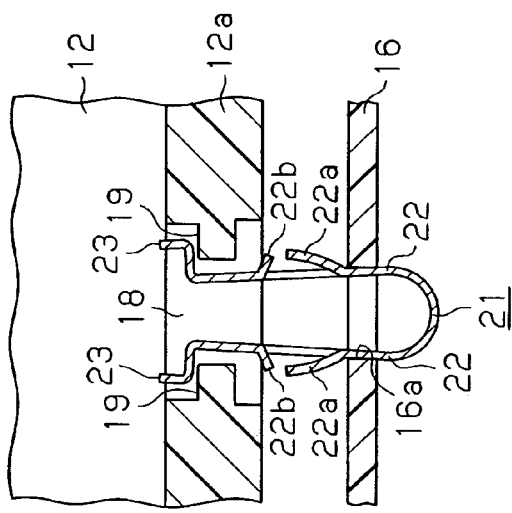
FIG. 6(b) is partial cross-sectional view illustrating a clip inserted in fitting hole.
Figure 6C:
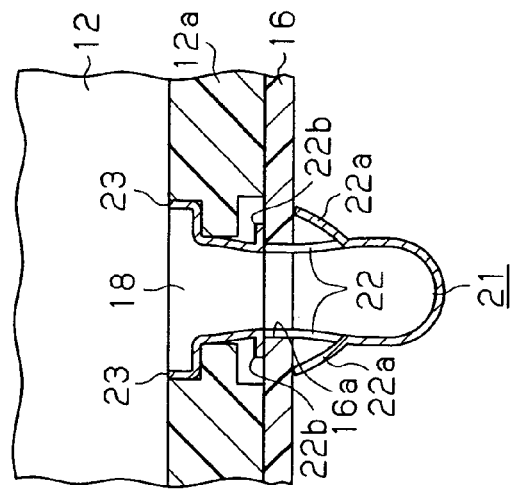
FIG. 6(c) is a partial cross-sectional view illustrating the console body of FIG. 1, after the console body is assembled with the brackets.

Then, as shown in FIG. 6(b), the lower end of each clip 21 is inserted into the corresponding fitting hole 16a. The bottom wall 12a of the console body 12 is further brought closer to the brackets 16 so that the fitting portions 22 of each clip 21 slide on the inner wall of the fitting hole 16a, and the fitting portions 22 are further inserted into the fitting hole 16a while being pressed inward. Subsequently, the clip 21 is pushed into the fitting hole 16a until the holding portions 22b of the clip 21 contact the upper surface of the bracket 16 so that the bottom wall 12a is placed on the brackets 16. As a result, as shown in FIG. 6(c), each fitting portion 22 presses with its elasticity itself against the inner wall of the fitting hole 16a. At the same time, the projections 22a are engaged with a portion of the lower surface (back) of the bracket 16 around the fitting hole 16a. In this state, the holding portions 22b and the projections 22a of the clip 21 hold in between a portion of the bracket 16 around the fitting hole 16a. In this manner, the console body 12 is attached to the brackets 16 by means of the clips 21.

Figure 7B:
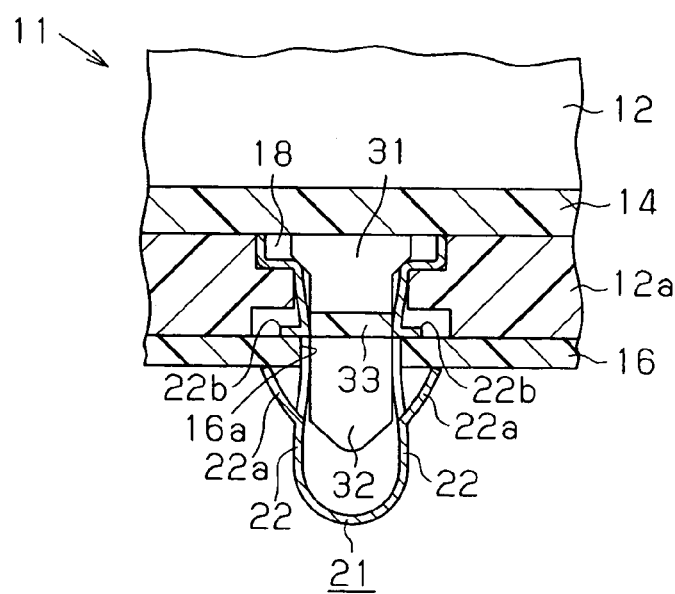
FIG. 7(b) is a partial cross-sectional view illustrating the console body of FIG. 1, after the bottom cover is assembled with the brackets.

Then, as shown in FIGS. 5 and 7(a), the bottom cover 14 is put inside the console body 12 with the lid 13 open, such that each fastening member 31 faces the corresponding insertion hole 18 of the console body 12. As shown in FIG. 7(b), the legs 32 of each fastening member 31 are inserted between the fitting portions 22 of the corresponding clip 21, and the bottom cover 14 is placed on the bottom wall 12a of the console body 12. In this manner, the console 11 is attached to the brackets 16.

In a state where each pair of legs 32 placed between the corresponding fitting portions 22, the sides of the legs 32 contact the inner surfaces of the fitting portions 22. Therefore, the legs 32 reliably prevent the fitting portions 22 from being deformed inward. That is, the console 11 of the present embodiment prevents spaces from being created between the outer surfaces of each pair of the fitting portions 22 and the inner wall of the corresponding insertion hole 18 (the fitting hole 16a) due to a reduced distance between the fitting portions 22, thereby preventing the console body 12 from chattering.

The above embodiment has the following advantages.

The console body 12 is attached to the brackets 16 by fitting the fitting portions 22 of the clips 21 attached to the bottom wall 12a into the fitting holes 16a of the brackets 16. At this time, each pair of the fitting portions 22 slide on the inner walls of the corresponding fitting hole 16a and are bent accordingly, which permits the clip 21 to smoothly inserted into the fitting hole 16a. Thereafter, each clip 21 (the fitting portions 22) restores the original shape so that the fitting portions 22 are smoothly fitted to the fitting hole 16a. This fixes the console body 12 at the position. Therefore, unlike a conventional technique in which a body of a console is fixed to brackets with screws, the above embodiment requires no screws. Thus, the assembly of the console body 12 in an automobile assembly line is facilitated.

After the console body 12 is attached to the brackets 16, each pair of legs 32 are put between the corresponding fitting portions 22 with the sides of the legs 32 contacting the inner surfaces of the fitting portions 22. That is, the fitting portions 22 of each clip 21 are held between the inner wall of the fitting hole 16a and the legs 32. Accordingly, each pair of legs 32 support the corresponding fitting portions 22 from inside. Thus, the present embodiment prevents the fitting portions 22 from being deformed inward, for example, by rocking of the vehicle. Therefore, no space is created between the fitting portions 22 and the inner wall of the fitting hole 16a. This prevents the console body 12 from chattering.

In a state where the console body 12 is attached to the bracket 16, the projections 22a and the holding portions 22b of each clip 21 hold a portion of the corresponding bracket 16 around the fitting hole 16a in between. As a result, the clip 21 is firmly secured to the bracket 16 and is prevented from moving slightly by rocking of the vehicle. Therefore, chattering of the console body 12 is further reliably prevented.

The horizontally extending reinforcing portion 33 is provided between each pair of the legs 32. Therefore, even if external force is applied to the legs 32, the reinforcing portion 33 prevents the legs 32 from being deformed. That is, the reinforcing portion 33 prevents the legs 32 from approaching each other. Thus, the legs 32 maintain a favorable contact with the fitting portion 22 for an extended period. This reliably prevents a space from being created between the fitting portions 22 and the inner wall of the fitting hole 16a.

Each reinforcing portion 33 is located close to the proximal ends of the corresponding legs 32. Thus, in the above illustrated embodiment, when each pair of legs 32 are inserted between the fitting portions 22 of the corresponding clip 21, the distal ends of the legs 32 smoothly follow the shape of the fitting portions 22. Accordingly, the legs 32 are smoothly inserted between the fitting portions 22, which permits the bottom cover 14 to be easily installed.

The console body 12 has the bottom cover 14 that covers the insertion holes 18 and has the fastening members 31. The bottom cover 14 covers the insertion holes 18 of the console body 12 so that the holes 18 are not visible. This improves the appearance of the console body 12.

The projection 22a is provided on the outer surface of each fitting portion 22. When each pair of the fitting portions 22 are inserted into the corresponding fitting hole 16a, the projections 22a contacts a portion of the bracket 16 surrounding the fitting hole 16a.

The projections 22a reliably support the clip 21 with respect to the corresponding bracket 16, and prevents the clip 21 from coming off the fitting hole 16a. This configuration permits the console body 12 to be stably attached to the brackets 16.

The present embodiment may be modified as described below.

The reinforcing portions 33 of the fastening members 31 may be omitted.

The number of the legs 32 of each fastening member 31 is not limited to two, but may be one or more than two.

Figure 8:
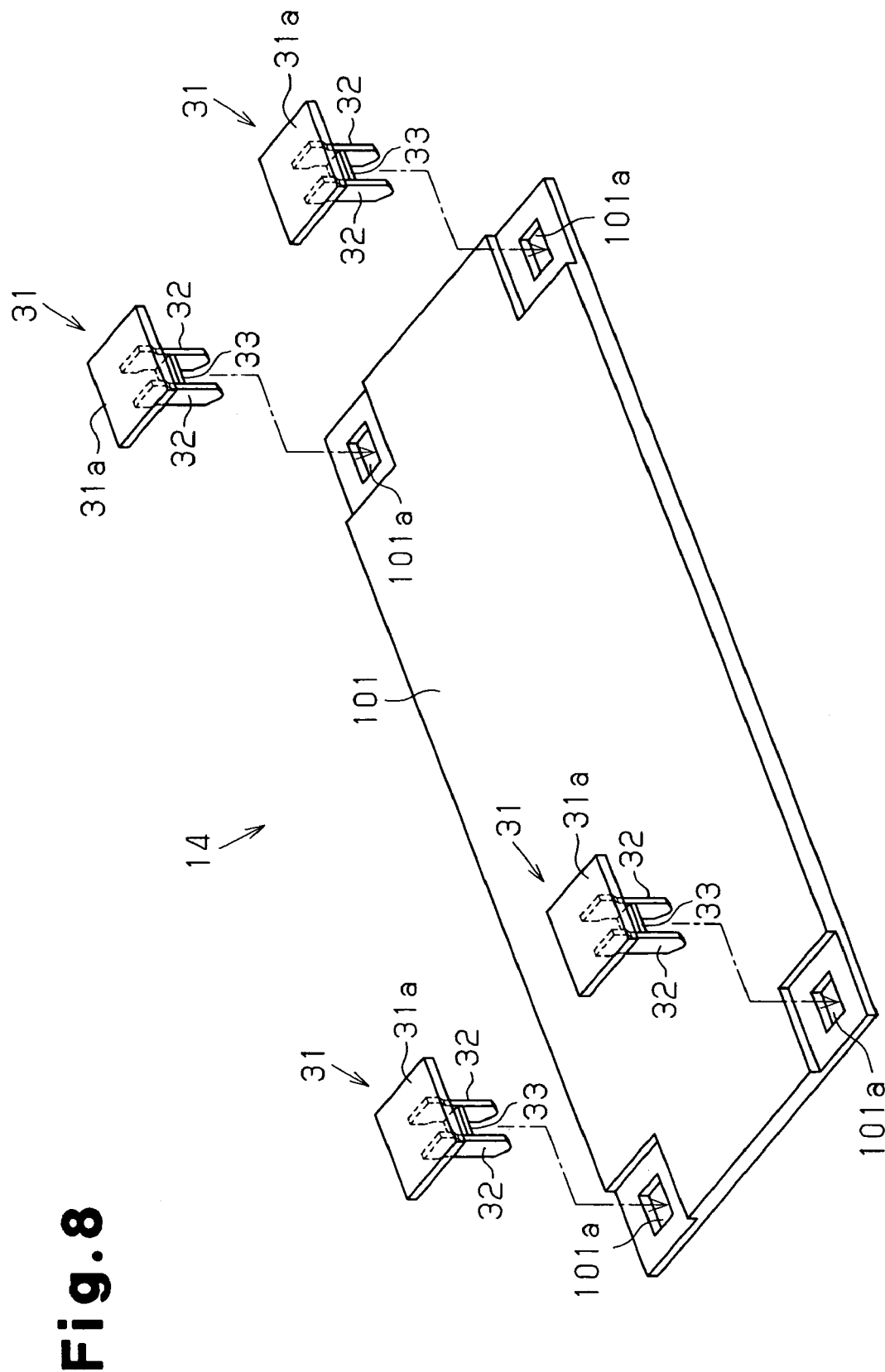
FIG. 8 is a perspective view illustrating a bottom cover according to another embodiment.

FIG. 8 illustrates another modified embodiment. In the embodiment of FIGS. 1 to 7(b), the fastening members 31 are integrated with the bottom cover 14. In the embodiment of FIG. 8, the fastening members 31 are formed separately from the bottom cover 14. That is, the bottom cover 14 includes a rectangular cover body 101 and the fastening members 31. Each fastening member 31 includes a square base plate 31a, a pair of legs 32 extending downward from the lower surface of the base plate 31a, and a reinforcing portion 33 extending between the legs 32. On the other hand, a through hole 101a is formed in each of the four corners of the cover body 101.

In a state where the cover body 101 is placed on the bottom wall 12a of the console body 12, the legs 32 are inserted into the through holes 101a, such that each pair of the legs 32 are placed between the corresponding fitting portions 22. Accordingly, the cover body 101 is attached to the brackets 16. In the embodiment of FIG. 8, the cover body 101 may be omitted.

Each pair of the legs 32 may be arranged parallel to each other such that the inner surfaces of the legs 32 face each other along the lateral direction of the vehicle. In this case, the outer surfaces of the legs 32 contact the inner surfaces of the clips 21.

The shape of the projections 22a of the clips 21 is not limited to the illustrated one. That is, the projections 22a may have any shape as long as when the console body 12 is attached the bracket 16, the distal end of each projection 22a is engaged with the lower surface of the corresponding bracket 16.

Either or both of the projections 22a and the holding portions 22b of the clips 21 may be omitted.

Only one of each pair of the fitting portions 22 may have the projection 22a and the holding portion 22b.

In the embodiment of FIGS. 1 to 7(b), each clip 21 has a pair of the fitting portions 22. However, clips each having three or more fitting portions may be employed. In this case, it is preferable that at least a pair of fitting portions face each other so that legs of a fastening portion can be placed between the facing fitting portions. The shapes of the insertion holes and the fitting holes are changed according to the shape of the clips.

The mounting structures according to the embodiments may be applied to an airbag ECU, a printed board on which an airbag impact sensor and other components are mounted, or a console having cup holders and an ashtray. Particularly, in a case of a vehicle equipped with an electronic transmission (shift-by-wire unit), the automatic transmission unit may be assembled with the console of any of the embodiments.

For example, in a case of a mechanical transmission, the console is installed after an automatic transmission unit is fixed to the floor panel of a vehicle. In this case, even if the console is displaced relative to the automatic transmission unit, both of the automatic transmission unit and the console cannot be largely moved. As a result, gap can be created between a panel covering the automatic transmission unit and the console. In other cases, parting lines formed between the automatic transmission unit panel and the console can be curved or displaced.

In contrast to this, in a case of an electronic transmission, the automatic transmission unit can be assembled with a console in advance, and the console with the automatic transmission unit is attached to the floor panel of the vehicle. That is, when attaching the automatic transmission unit to the console in advance, the position of the automatic transmission unit is not firmly fixed, and the position of the automatic transmission unit can be easily adjusted relative to the console.

Also, like the automatic transmission unit of a mechanical transmission, an airbag ECU and a printed board are conventionally fixed to the floor panel of a vehicle and can be displaced relative to a console. However, by employing a configuration in which an airbag ECU and a printed board are assembled with a console, the console is prevented from being displaced relative to the floor panel.

On the other hand, cup holders and an ashtray are conventionally attached to a console after the console is installed. Particularly, in a case of a conventional console that is installed with screws, cup holders and an ashtray are attached to hide the screws. In such a case, a console is first attached to the floor panel. Thereafter, cup holders and an ashtray are attached to the console in the confined passenger compartment, which can cause the cup holders and the ashtray to be displaced from proper positions.

In contrast to this, if cup holders and an ashtray are attached to a console in advance, the attaching of the cup holders and the ashtray does not need to be performed in a confined passenger compartment. That is, it is possible to attach the cup holders and the ashtray to the console in a spacious area outside the vehicle and to adjust the positions of the cup holders and the ashtray. Then, with the cup holders and the ashtray at proper positions, the console is attached to the floor panel.

Therefore, the cup holders and the ashtray are prevented from being displaced relative to the console.

Therefore, a console to which an automatic transmission unit, an air bag. ECU, a printed board, cup holders, and an ashtray are assembled in advance is less likely to be displaced from a proper position. Also, the attached components such as the automatic transmission unit are less likely to be displaced relative to the console. Thus, compared to conventional consoles, the console of this invention has an improved appearance. A configuration in which components such as an automatic transmission unit are attached to a console in advance becomes feasible by employing the mounting structure of the present invention, which facilitates installing of the console and reliably prevents the console from chattering.

In the illustrated embodiments, the number of the clips 21 is four, but the number of the clips 21 is not limited to four. The number of the clips 21 may be less than or more than four.

The brackets 16 may be omitted. In this case, the fitting holes 16a are directly formed in the floor panel 15, and the console body 12 is directly attached to the floor panel 15.

Figure 9:
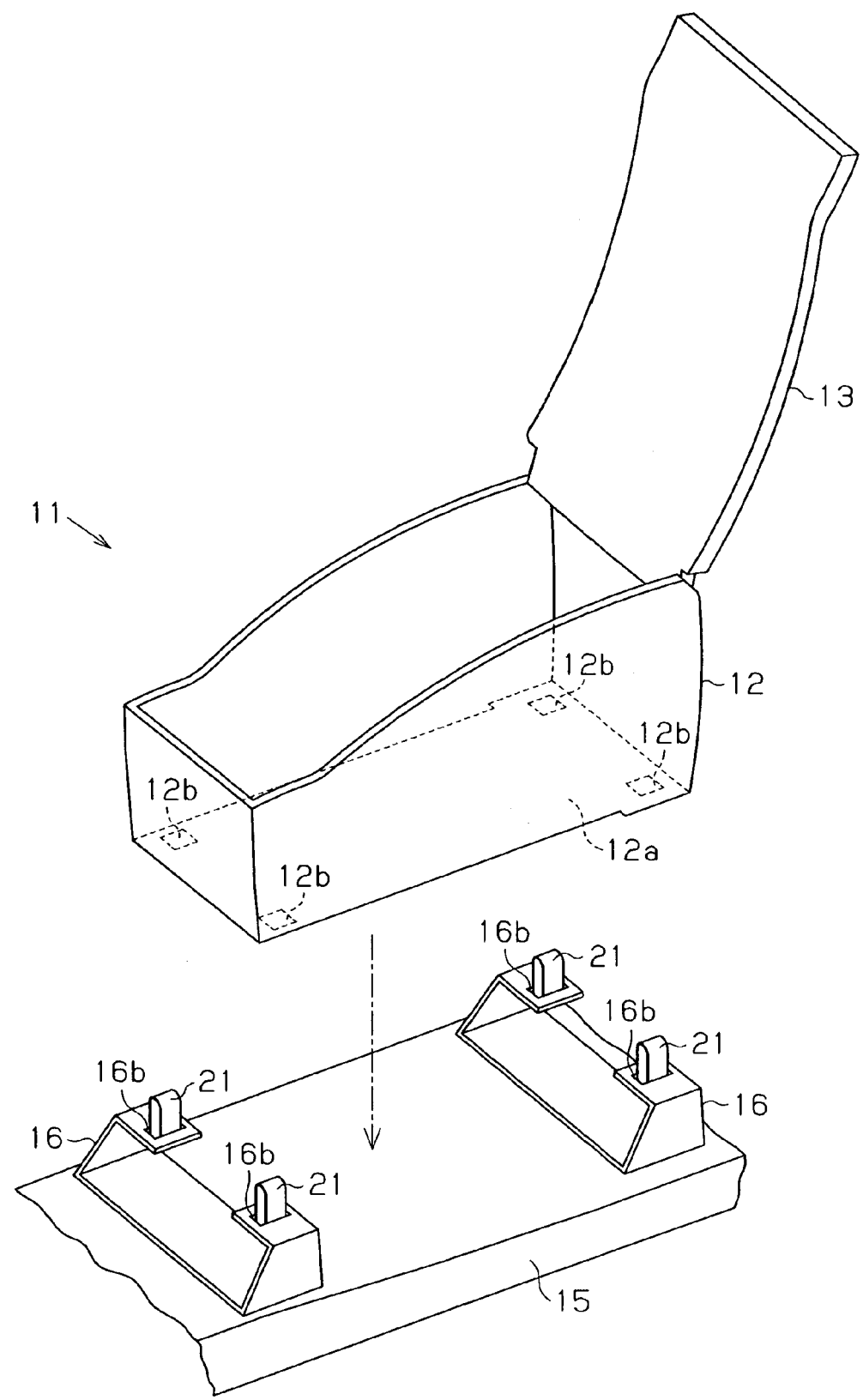
FIG. 9 is an exploded perspective view illustrating a console according to another embodiment.

FIG. 9 illustrates another embodiment, in which the clips 21 are attached to the brackets 16, and insertion holes 16b are formed in the brackets 16. Also, fitting holes 12b are formed in the bottom wall 12a of the console body 12. In this case, a fastening member 31 as illustrated in FIG. 8 is inserted into each insertion hole 16b from the lower side of each bracket 16.

Therefore, the present examples and embodiments are to be considered as illustrative and not restrictive and the invention is not to be limited to the details given herein, but may be modified within the scope and equivalence of the appended claims.

The invention claimed is:

1. A console attached to a floor panel of a vehicle, the floor panel having a fitting hole, the console comprising:
    a console body having a bottom wall, wherein the bottom wall has an insertion hole;
    a clip provided at a portion of the bottom wall that corresponds to the insertion hole, the clip having at least two fitting portions that are arranged to face each other, wherein, when the clip is inserted into the fitting hole, the fitting portions are fitted to an inner wall of the fitting hole so that the console body is attached to the floor panel; and
    a fastening member inserted into the insertion hole, the fastening member having a leg, wherein, when the fastening member is inserted into the insertion hole with the clip inserted into the fitting hole, the leg is located between the fitting portions to prevent the clip from being removed from the fitting hole.

2. The console according to claim 1, further comprising a bottom cover for covering the insertion hole, wherein the fastening member is provided in the bottom cover.

3. The console according to claim 2, wherein the bottom cover is placed on the bottom wall in the console body, and wherein the fastening member is integrally formed with the bottom cover.

4. The console according to claim 1, wherein, when the fastening member is inserted into the insertion hole with the clip inserted into the fitting hole, each fitting portion is held between the leg and the inner wall of the fitting hole.

5. The console according to claim 1, wherein the clip has a pair of projections each extending from one of outer surfaces of the fitting portions, which outer surfaces face opposite directions from each other, and wherein, when the clip is inserted into the fitting hole, the projections are engaged with a portion of the floor panel around the fitting hole.

6. The console according to claim 5, wherein a holding portion is provided on the outer surface of each fitting portion of the clip, and wherein, when the clip is inserted into the fitting hole, each holding portion and the corresponding projection hold a portion of the floor panel around the fitting hole.

7. The console according to claim 6, wherein, when the clip has not been inserted into the fitting hole, a space is created between the projection and the holding portion of each fitting portion, which space is less than the thickness of a portion of the floor panel to be held by the projection and the holding portion.

8. The console according to claim 1, wherein, when the clip has not been inserted into the fitting hole, the distance between outer surfaces of the fitting portions, which outer surfaces face opposite directions from each other, is substantially equal to or slightly more than the distance between portions of the inner wall of the fitting hole, to which portions the fitting portions are to be fitted.

9. The console according to claim 1, wherein the leg is one of a pair of legs, and wherein a reinforcing portion is provided between the legs, and wherein the reinforcing portion prevents the legs from approaching each other.

10. The console according to claim 1, wherein a bracket is fixed to the floor panel, and wherein the bracket forms part of the floor panel and has the fitting hole.

11. A structure for mounting a console onto a floor panel of a vehicle, wherein a plurality of brackets each having fitting holes are fixed to the floor panel, wherein the console includes a console body having a rectangular bottom wall, wherein a insertion hole is formed in each of the four corners of the bottom wall, each insertion hole corresponding to one of the fitting holes, wherein clips are provided at portions of the bottom wall, each portion corresponding to one of the insertion holes, wherein each clip has at least two fitting portions that are arranged to face each other, wherein, when each clip is inserted into the corresponding fitting hole, the fitting portions are fitted to an inner wall of the fitting hole so that the console body is attached to the brackets, and wherein, with the clips inserted into the fitting holes, a fastening member having a leg is inserted into each insertion hole so that the leg is located between the corresponding fitting portions to prevent the clip from being removed from the fitting hole.

12. The mounting structure according to claim 11, wherein the console further includes a bottom cover for covering the insertion holes, and wherein the fastening members are provided in the bottom cover.

13. The mounting structure according to claim 12, wherein the bottom cover is placed on the bottom wall in the console body, and wherein the fastening members are integrally formed with the bottom cover.

14. The mounting structure according to claim 11, wherein, when the fastening members are inserted into the insertion holes with the clips inserted into the fitting holes, each fitting portion is held between the corresponding leg and the inner wall of the corresponding fitting hole.

15. The mounting structure according to claim 11, wherein each clip has a pair of projections each extending from one of outer surfaces of the fitting portions, which outer surfaces face opposite directions from each other, wherein, when each clip is inserted into the corresponding fitting hole, the projections are engaged with a portion of the corresponding bracket around the fitting hole.

16. The mounting structure according to claim 15, wherein a holding portion is provided on the outer surface of each fitting portion of each clip, wherein, when each clip is inserted into the corresponding fitting hole, each holding portion and the corresponding projection hold a portion of the corresponding bracket around the fitting hole.

17. A structure for mounting a console onto a floor panel of a vehicle, wherein a bracket having an insertion hole is fixed to the floor panel, wherein a clip is provided at a portion of the bracket that corresponds to the insertion hole, wherein the clip has at least two fitting portions that are arranged to face each other, wherein the console includes a console body having a bottom wall, wherein a fitting hole is formed in the bottom wall, wherein, when the clip is inserted into the fitting hole, the fitting portions are fitted to an inner wall of the fitting hole so that the console body is attached to the bracket, and wherein, with the clip inserted into the fitting hole, a fastening member having a leg is inserted into the insertion hole so that the leg is located between the fitting portions to prevent the clip from being removed from the fitting hole.

* * * * *